Sept. 29, 1931. R. G. REYNOLDSON 1,825,205
MEAT TRIMMING APPARATUS
Filed Aug. 22, 1929 3 Sheets-Sheet 3
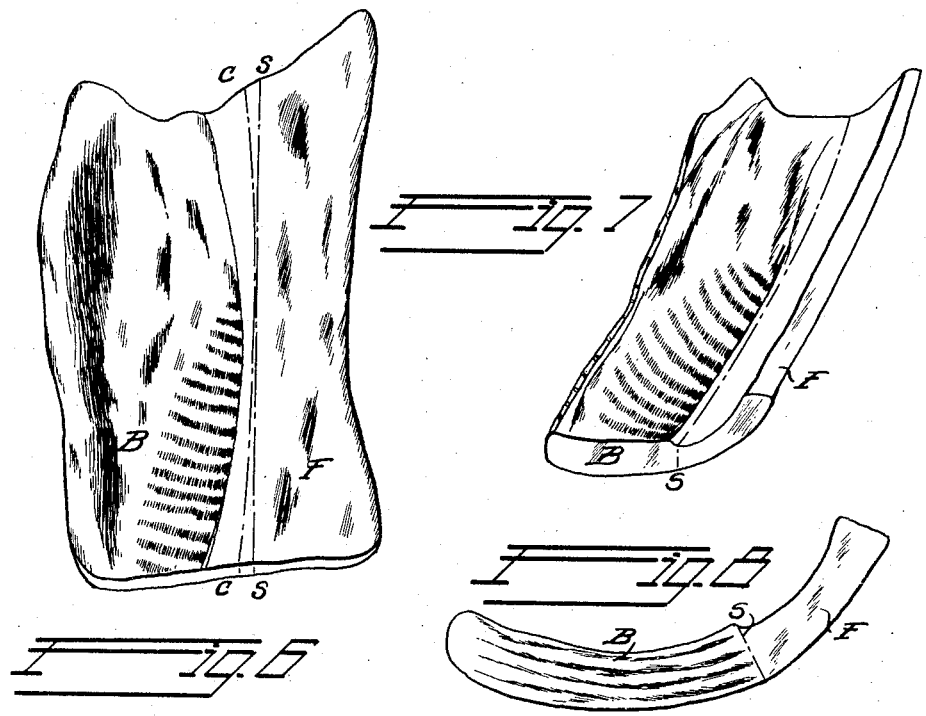
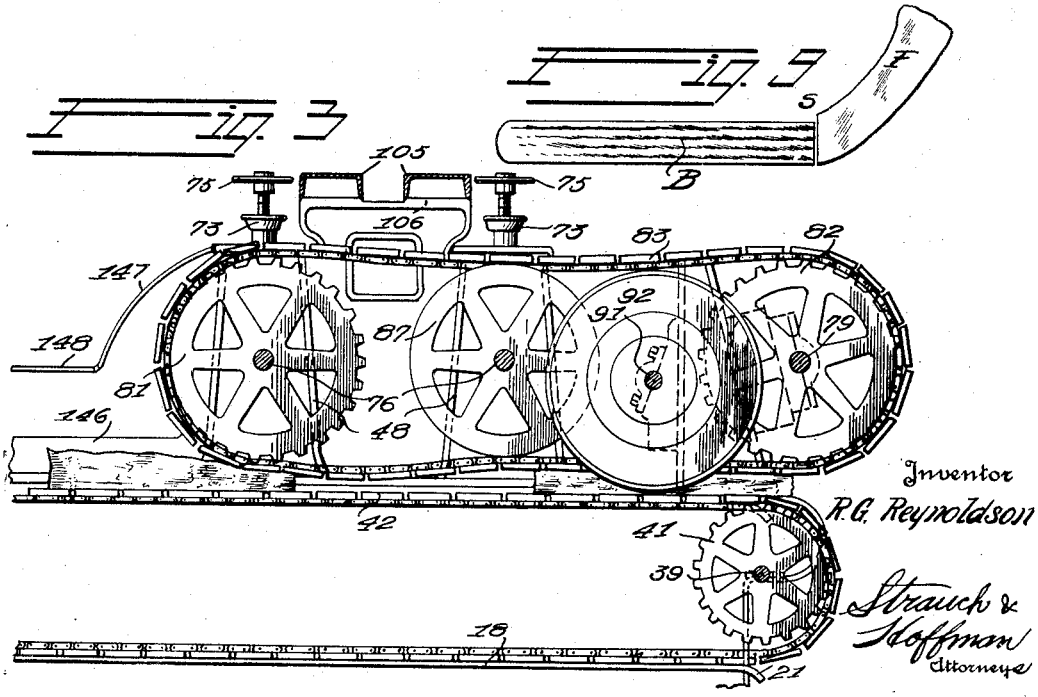

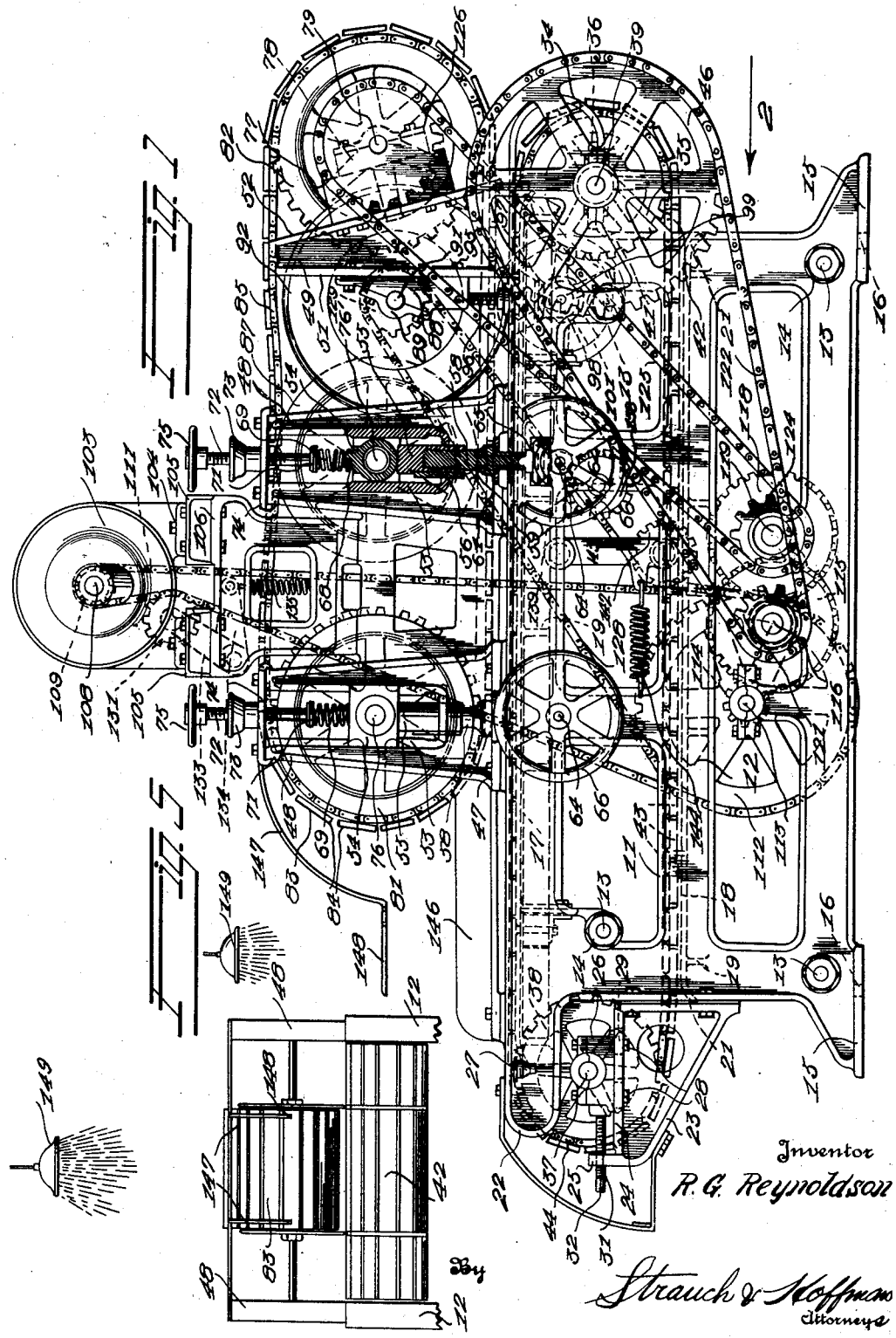

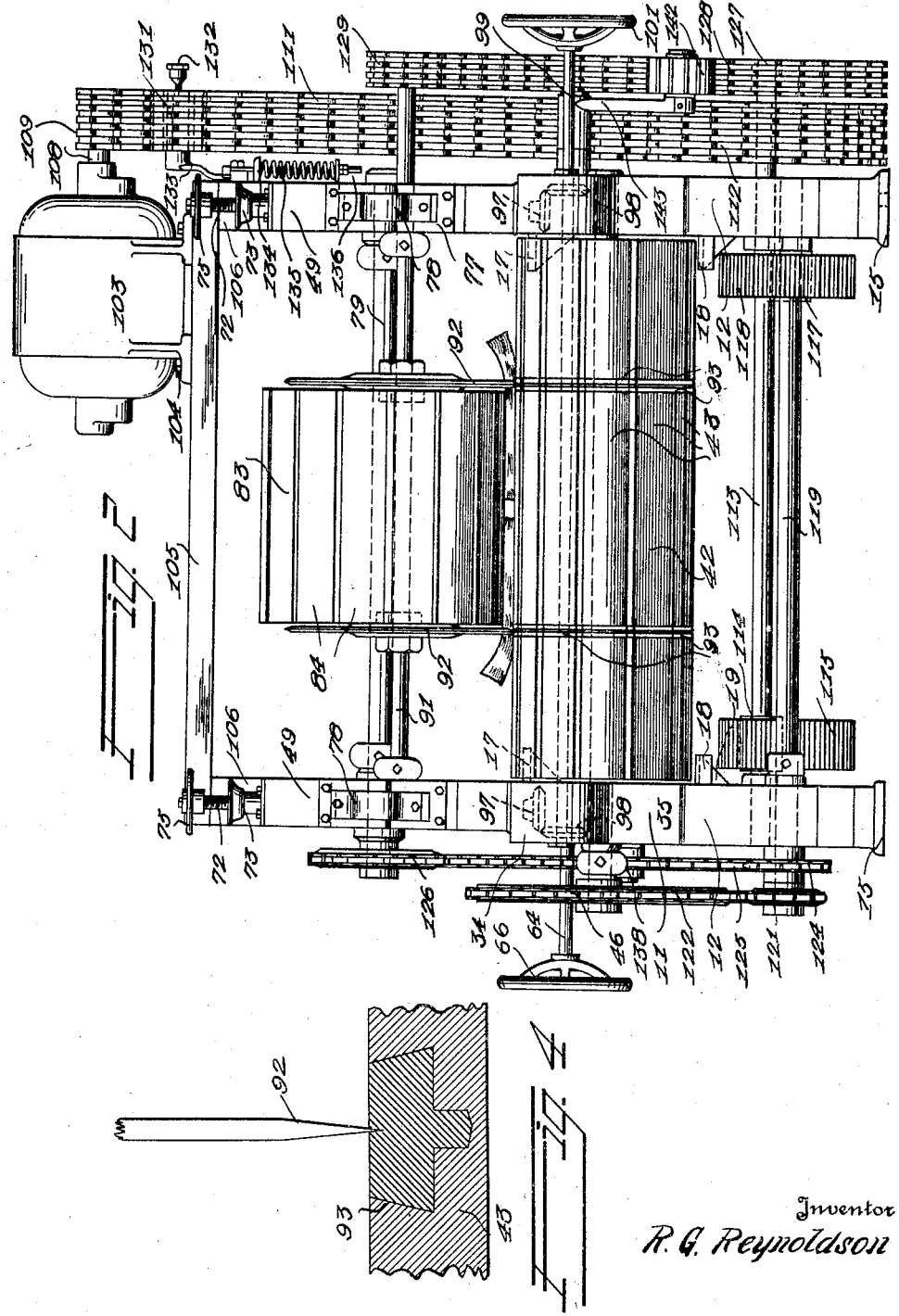

Patented Sept. 29, 1931

1,825,205

UNITED STATES PATENT OFFICE

R. G. REYNOLDSON, OF MADISON, WISCONSIN, ASSIGNOR TO THE ALLBRIGHT-NELL COMPANY, OF CHICAGO, ILLINOIS, A CORPORATION OF ILLINOIS

MEAT TRIMMING APPARATUS

Application filed August 22, 1929. Serial No. 387,643.

The present invention relates to meat trimming methods and apparatus.

More specifically, the invention relates to an improved machine for simultaneously flattening and trimming slabs of meat in an efficient and expeditious manner.

It is the practice in packing houses to cut the central portions of hogs into two strips, each of which is of a length equal to the distance between the shoulders and the hams and of a width equal to the distance from the middle line of the belly to the center line of the back. Each of these strips includes a belly portion and a fat back portion, which portions are later separated.

Each of the belly portions has a tendency to curl and has a variable thickness. This variable thickness of the meat as well as the tendency to curl is objectionable because substantially greater packing space is required than would be required for an equal amount of meat in a flattened condition and of substantial uniform thickness, and furthermore meat in this condition is less attractive in appearance than when flattened, as well as being inconvenient to handle and difficult to accurately slice for ultimate use.

This objectionable feature has long been recognized and was first overcome by subjecting the strips of meat to a vertically moving pounder in which the strips of meat were shifted back and forth upon a bed until slabs of approximate uniform thickness were produced by the action of the pounder. This method of flattening hog bellies was noisy and the capacity of output was very limited.

The above described method of flattening hog bellies was superseded by rolling machines which were relatively quiet in operation and which had a much greater output capacity. These machines proved satisfactory for flattening hog bellies and imparting a substantially uniform thickness thereto and enabled such operations to be carried out at substantially less expense in that the capacity output was greater than in the former method.

While such machines as above referred to were satisfactory for flattening strips of meat only, it was still necessary to trim the meat which trimming was preferably done subsequent to the flattening operation by hand labor in order to provide a substantially straight cut, and which trimming required the services of two men for the output of each machine.

It has been proposed to provide rotating knives in connection with machines of the general character above noted, whereby the fat backs may be cut from the bellies or other slabs of meat trimmed, simultaneously with the flattening thereof, thus still reducing the expense.

Machines of the character above noted as heretofore constructed comprise a lower conveyor and rollers rotatably journaled above said conveyor, which rollers in conjunction with said conveyor upon rotation of the rollers and movement of the conveyor, flatten the strips of meat between them as said strips are moved forward. With said constructions hog bellies for example, which as before stated are of unequal thickness undergo a slight turning movement in passing through the machine which presents no objection when the flattening of the bellies only is concerned, but in the utilization of knives in such machines it is highly important that the bellies undergo no turning movement in order that the knives will present a straight cut in trimming the fat back from the belly.

Furthermore in machines wherein rotary knives have been used to sever the fat back from the belly it has been deemed necessary to run the knives at comparatively high speed such as 400 R. P. M. With such speeds of the cutting knives the meat comes through the machine with the cut edges thereof having the appearance of having been cut with a rough rip saw, with an unsightly smear of melted fat along the edges. This fault is partly due to the rapid rotation of the knives, and partly due to the uneven pressure of the rollers on the belly. High-speed knives have a tendency to heat the meat and melt some of the fat, causing a smear of lard along the cut edge.

When such rollers are used the relatively soft meat has a tendency to squeeze out from beneath the rollers with a resultant enlarged hump adjacent said roller.

It is a primary object of this invention to provide a combined machine having flattening means and cutting means, said flattening means adapted to advance strips of meat toward said cutting means in a manner such that said cutting means provides a straight cut.

It is a further object of the invention to provide a novel method of rolling and trimming slabs of meat in which the slabs are advanced between endless conveyors past knives, to thus insure that the cut is made in a straight line.

It is a further object of the invention to provide a rolling machine for slabs of meat comprising compressing and conveying means, said means adapted to subject slabs of meat to a combined pressing and ironing action.

It is a still further object of the invention to provide a combined rolling and trimming machine having yieldable conveying and flattening means for subjecting slabs of meat to pressure to provide uniform thickness thereof, with a cutting means for trimming part of the slabs of meat simultaneously with the pressing action thereof.

A further object of the invention is to provide a fat back cutting machine in which the cut meat has smooth, even cut edges. This is partly accomplished by providing rotary knives wherein the speed of the knives is materially reduced from the speed used in prior constructions, whereby there is no tendency to melt the fat of the meat. Also by the use of two endless conveyors instead of a conveyor and a roller, the meat is held under even pressure throughout and cannot pile up, so that the knives may cut smoothly and evenly.

A further object of the invention it to provide a combined belly roller and a fat back trimmer comprising flexible conveying and pressing means adapted for conveying and pressing a series of pork belly strips, and cutting means adapted to trim the fat backs from said pork belly strips.

A still further object of the invention is to provide a combined belly roller and fat back trimmer comprising a relatively wide lower conveyor, a substantially narrower upper conveyor and a rotatable knife at either side of said upper conveyor.

A still further object of the invention is to provide a roller and trimmer for meat slabs comprising conveying and pressing means, trimming means, and novel means for visibly indicating the initial positioning of strips of meat on said conveying means for accurate alignment with said trimming means.

A still further object of the invention is to provide a combined belly roller and fat back trimmer comprising flexible and yieldable conveying and pressing means, fat back cutting means, and adjusting means for adjusting said conveying and pressing means.

A still further object of the invention is to provide a construction of the above noted character which is comparatively simple in construction, relatively inexpensive to manufacture, and is well adapted to the purpose for which it is intended.

With the above objects in view as well as others that will become apparent during the course of the following disclosure reference will be had to the accompanying drawings forming part of same wherein is disclosed a preferred physical embodiment of the invention and in which:

Figure 1 is a side elevational view of the machine constructed in accordance with a preferred embodiment of the invention, parts being shown in section.

Figure 2 is an end elevational view of the construction illustrated in Figure 1 as seen in the direction of arrow 2.

Figure 3 is a fragmentary vertical longitudinal sectional view of the construction illustrated in Figures 1 and 2 particularly illustrating the co-operative action of the conveying and pressing means on pork belly strips.

Figure 4 is a fragmentary sectional view illustrating the rotary knife edge engaging means in the flights of the lower conveyor.

Figure 5 is a fragmentary front elevational view more or less diagrammatic particularly illustrating the meat strip position indicating means.

Figure 6 is a plan view slightly in perspective of the pork side of a strip of meat comprising the belly and fat back and indicating by dot and dash lines desirable and undesirable cuts produced by the fat back cutting means.

Figure 7 is a perspective view of a strip of meat similar to that indicated in Figure 6 prior to operation thereon by the machine embodied in the present invention.

Figure 8 is an end view on an enlarged scale of the strip of meat illustrated in Figure 7.

Figure 9 is a view similar to Figure 8 indicating the pork belly after operation by the present machine and with the fat back removed by the cutting means embodied in the invention.

Referring to the drawings by reference characters in which like characters designate like parts, 11 designates a suitable frame construction which is preferably cast and comprises opposite side members 12 rigidly connected in laterally spaced relation by transverse rods 13 which for sake of clearness are omitted in Figure 2 and which may be provided with suitable shoulders for engaging the inner surfaces of members 12 and are provided with nuts 14 on the outer ends thereof for drawing the body portions of members 12 into firm engagement with said shoulders. The frame members 12 as particularly illustrated in Figure 1 are preferably of skeleton-like formation thus providing a relatively light frame construction and in order to provide sufficient rigidity each frame member 12 preferably comprises integrally connected I-beam portions. The frame member 11 embodies suitable foot portions 15 which may be provided with apertures 16 for the reception of securing elements for securing the frame to a suitable base such for example as a floor. Each member 12 of frame 11 embodies a pair of vertically spaced parallel lower conveyor flight guide rails 17 and 18 which are integral with member 12 and are reinforced by integral webs 19 and each of the rails 17 and 18, as is clearly illustrated in Figure 1, has the opposite ends thereof curved inwardly as indicated at 21 for obviating any obstruction to the approach of the successive conveyor flights.

Each of the frame members 12 embodies a forward projection 22, and secured to the vertical face of the forward end of each member 12 beneath projection 22 is a bearing-supporting bracket 23 embodying a base 24 and a vertical extension 25. Supported on base 24 is a shaft bearing 26 provided with a lubricating connection 27. Bearing 26 is secured to base 24 by bolts 28 threaded into bearing 26 and projecting through elongated recesses 29 in base 24 which recesses permit bearing 26 to be moved fore or aft on base 24, the bearing 26 being maintained against movement upon tightening of bolts 28. In order to effect movement or adjustment of bearing 26 in order to adjust tension of a conveyor engaged by a sprocket or a shaft supported by bearing 26, a screw 31 has one end thereof swivelly connected with bearing 26 and the body portion thereof extends through a threaded bore in extension 25 and the opposite end of screw 31 is angular, as indicated at 32 for engagement by a suitable tool for turning screw 31 with the resultant fore or aft movement of bearing 26.

The opposite or rear end of each frame member 12 is provided with a projection 34 the base portions of which are reinforced by webs 35 connecting each base portion and the adjacent vertical end wall of members 12. Secured to each base portion of projections 34 is a bearing 36. Rotatably journaled in bearings 26 are the opposite ends of a shaft 37 to which are secured intermediate the frame members 12 a pair of laterally spaced sprocket wheels 38 and rotatably journaled in bearings 36 are the opposite ends of a shaft 39 to which is secured a pair of laterally spaced sprocket wheels 41 in longitudinal alinement with sprocket wheels 38. Operatively engaged with sprocket wheels 38 and 41 is an endless conveyor 42 embodying a multiplicity of transversely disposed slats or flights 43 which are interconnected by laterally spaced chain members 44 for driving engagement with sprocket wheels 38 and 41. Shaft 39 at one end thereof projects outwardly of the respective bearing 36 and has secured thereto the hub portion of a relatively large driving sprocket 46 which is driven in a manner hereinafter described for imparting rotation to shaft 39 and accordingly movement of conveyor 42.

Suitably supported on the upper horizontal face of each frame member 12 as indicated at 47 is a pair of brackets 48, the brackets 48 on each frame member 12 being longitudinally spaced as indicated in Figure 1 thus providing two pairs of transversely alined brackets 48. Supported on the horizontal face of each frame member 12 rearwardly of brackets 48 is a bracket 49 which as indicated in Figure 1 is provided with a vertical front face 51 and a rear inclined face 52 thus providing a transversely alined pair of such brackets supported on frame member 11. Each of the brackets 48 has a centrally disposed vertical guide 53 in which is slidably disposed for vertical movement therein a shaft bearing 54. Each bearing 54 is engaged by the outer end of an internally threaded vertical member 55 projecting through and slidably disposed in the bottom of guide 53, each member 55 being retained against rotative movement about its longitudinal axis by means of a key member 56 co-operating with guide 53 and member 55. Projecting into the internally threaded bore of each member 55 is an externally threaded member 58 which adjacent the inner end thereof is reduced as indicated at 59 and rotatably journaled in a bearing 61 in the base of bracket 48. Secured to the inner end of the reduced portion of each member 58 is a bevel pinion 62 which pinions are horizontally disposed in transversely alined pairs within frame member 11 as clearly indicated in Figure 1. Rotatably journaled in the opposite frame members 12 vertically beneath each pair of members 58 is a transversely extending shaft 64 to which is secured adjacent each end thereof a bevel pinion 65 for meshing engagement with a corresponding pinion 62. Secured to corresponding ends of each of the shafts 64 externally of frame member 11 is a hand wheel 66 upon rotation of which shafts 64 are rotated and accordingly pinions 65 which through engagement with pinions 62 impart rotation to members 58 which in turn due to their threaded connection with members 55 impart vertical movement to shaft bearings 54 for a purpose hereinafter described.

Each of the bearings 54 is provided with a cylindrical extension 68 about which is engaged one end of a helical spring 69 the opposite end of which engages a cap member 71 rockably engaged with the inner end of a screw 72 which is threadedly engaged in a member 73 supported by a top plate 74 of the respective bracket 48, the outer end of screw 72 being provided with a hand wheel 75 whereby upon manual rotation of hand wheel 75 caps 71 may be raised or lowered for decreasing or increasing the compression in the respective spring 69 for a purpose later described, the springs 69 yieldably holding bearing members 54 in engagement with the outer ends of members 55 but permitting movement thereof away from members 55 under a yieldable resistance. Rotatably supported in each transversely disposed pair of bearings 54 are the opposite ends of a shaft 76.

Connected with the rear face 52 of each of the brackets 49 is a bearing supporting block 77 to which is secured a bearing 78 thus providing a transversely disposed pair of bearings in which are rotatably journaled the opposite ends of a shaft 79. Secured to the forward shaft 76 are a pair of transversely disposed sprockets 81 and secured to shaft 79 in longitudinal disposition with sprockets 81 are a pair of transversely spaced sprockets 82. Engaged with sprockets 81 and 82 and driven thereby is an endless conveyor 83 which is of the same general construction as the lower conveyor 42 comprising transversely disposed flights or slats 84 interconnected by chain members 85 for driving engagement with sprockets 81 and 82. It will be observed however as clearly indicated in Figure 2 that conveyor 83 is substantially narrower than conveyor 42, the conveyor 42 being of a width substantially equal to the distance between frame members 12 and conveyor 83 being disposed centrally thereof for a purpose hereinafter described.

Secured to the rear shaft 76', which shaft is substantially intermediate the forward shaft 76 and the rear shaft 79, is a pair of rollers 87 which are disposed slightly outwardly of sprockets 81 and 82 for rolling contact with the inner surface of the upper flights 84 outwardly of chain members 85 (see Figure 3).

Adjustably engaged with the vertical face of each of the brackets 49 is a bearing support 88 to which is secured a bearing 89 for the opposite ends of a shaft 91 to which shaft are secured a pair of transversely spaced rotary cutting knives 92 which as indicated in Figure 2 are disposed outwardly of but contiguous to the opposite sides of conveyor 83 for cooperation with conveyor 42. The knives 92 are adapted to cut strips of meat carried by conveyor 42 which necessitates close contact between the cutting edges of knives 92 and the surface of conveyor 42 and accordingly means are provided in conveyor 42 for engagement of the edges of the knives without impairing the efficiency thereof. As shown in Figure 4, such means preferably comprises the formation of angular shaped recesses 93 in the flights 43 of conveyor 42, the recesses 93 being formed in flights 43 in longitudinal disposition as indicated in Figure 2 providing in effect a continuous groove beneath each knife 92 and each of the recesses 93 is filled with a relatively soft material preferably lead whereby the edge of knife 92 may extend thereinto without substantial dulling effect on the knife cutting edge.

Each of the bearing supports 88 is secured to bracket face 51 by bolts 95 projecting through vertically elongated slots in face 51 whereby supports 88 may be raised or lowered by loosening the nuts on bolts 95 and upon tightening of which the supports 88 are secured in position, the raising or lowering of supports 88 adjusting the cutting edges of knives 92 relative to conveyor 42. In order to effect vertical adjustment of supports 88 a vertically disposed screw 96 has one end thereof engaged in a threaded recess in each of the supports 88 and the opposite or lower end of each screw 96 is provided with a bevel pinion 97 which pinions mesh with bevel pinions 98 secured to a shaft 99 rotatably journaled adjacent opposite ends thereof in frame member 11 and provided on one projecting end thereof with a hand operating wheel 101 upon rotation of which supports 88 upon loosening nuts on bolts 95 may be raised or lowered for effecting proper adjustment of knives 92 after which the nuts on bolts 95 are again tightened.

The construction in accordance with the present invention embodies novel driving arrangements which comprise a single prime mover which is preferably an electric motor 103 suitably secured as indicated at 104 to longitudinally spaced transversely disposed inverted channel members 105 which channel members are supported on and secured to the outer ends of brackets 106 formed with or suitably secured to the opposite frame members 12, the motor 103 being preferably disposed adjacent the left hand side of the machine from the front or entrance end thereof as indicated in Figure 2. The motor shaft 108 is provided with a sprocket 109 which is in driving engagement with a sprocket chain 111 preferably of the silent chain construction and which chain engages and imparts rotation to a substantially larger sprocket 112 secured adjacent one end of a transversely disposed shaft 113 whose opposite ends are suitably journaled in frame members 12 adjacent the basis thereof. Shaft 113 adjacent the end thereof opposite to sprocket 112 is provided with a pinion 114 in meshing engagement with a gear 115 secured to a shaft 116 parallel with shaft 113 and suitably journaled in frame members 11. Shaft 116 adjacent the opposite end thereof is provided with a pinion 117 in meshing engagement with a gear 118 secured to a shaft 119 which is parallel with shaft 116 and is suitably journaled adjacent opposite ends thereof in frame members 12. Shaft 116 is provided on one end thereof with a sprocket 121 which is in driving engagement with a sprocket chain 122 which is further in driving engagement with sprocket 46 for imparting rotation to shaft 39 and consequently movement of lower conveyor 42. Shaft 119 is provided with a sprocket 124 with which is operatively engaged a sprocket chain 125 which engages and imparts rotation to a sprocket 126 secured to shaft 79 for imparting rotation to sprockets 82 and consequently movement of the upper conveyor 83. The co-operating sprockets, gears and pinions included in the driving arrangement so far described are so relatively proportioned that the upper conveyor 83 moves slightly slower than the lower conveyor 42 for a purpose hereinafter described.

The shaft 113 which is the main drive shaft projects outwardly of sprocket 112 and is provided adjacent sprocket 112 with a sprocket 127 which operatively engages a sprocket chain 128 which chain engages a sprocket 129 on shaft 91 for imparting rotation to cutting knives 92, the driving arrangement being such that knives 92 are rotated at comparatively low speed for a purpose later described.

In the use of sprocket chain drives it is essential for most effective operation that the chains be maintained substantially taut and in accordance with the present invention means are provided for accomplishing this object. Such means preferably comprises spring tensioned idler sprockets. As indicated in the drawings sprocket chain 111 is maintained taut by an idler sprocket 131 the bearing of which is lubricated by a connection 132 and which bearing is supported by one arm 133 of a bell crank lever whose other arm 134 adjacent the free end thereof is engaged by one end of a helical spring 135 the opposite end of which is provided with an adjustable connection 136 for effecting greater or less tension in spring 135. The chain 125 is engaged by an idler sprocket 138 secured to one end of a swinging arm 139 which is engaged by one end of a coil spring whose opposite end is secured to frame 11 for holding sprocket 138 in yieldable engagement with chain 125. Chain 128 is engaged by an idler sprocket 142 which is rotatably secured to one end of a swinging arm 143 which is engaged by one end of a helical spring 144 the opposite end of which is secured to frame 11 for maintaining sprocket 142 in yieldable engagement with chain 128.

The lower conveyor 42 as is clearly indicated in Figure 1 projects substantially forwardly of the corresponding end of conveyor 83 for providing for the introduction of or placing of slabs of meat on conveyor 42 to be conveyed thereby and between the same and upper conveyor 83 in a manner more fully hereinafter described and frame members 12 adjacent the forward or feed end of conveyor 42 are provided with guides 146. The lower conveyor 42 is adapted to receive two series of meat slabs as indicated in Figure 2 for compression therebetween and conveyor 83 and for the cutting of the fat backs from the bellies by knives 92 and in order that knives 92, which are spaced substantially rearwardly of the feed end of the machine, will accurately engage the meat slabs at the proper points for cutting away the fat backs, indicating means are provided for accurately locating the meat slabs on the feed end of the conveyor 42 such that knives 92 will cut the fat backs from the bellies at the proper point. Such means preferably comprises two extensions 147 suitably secured to brackets 48 of the forward pair thereof, the extensions being provided with horizontally disposed knife edges 148 and a suitable light 149 is mounted above knife edges 148 such that said knife edges will project line shadows on the slabs of meat of the two series thereof in a position corresponding to the location of knives 92 whereby upon placing the slabs of meat on conveyor 42 with said shadow lines on the junction between the bellies and fat backs the knives will engage the slabs of meat at the proper positions to accurately cut the fat backs therefrom.

In operation of the improved machine motor 103 is set into operation which through chain 111 and co-operating sprockets 109 and 112 imparts rotation to the main drive shaft 113 which in turn imparts rotation to shafts 116 and 119 through the intermeshing pinion 114, gear 115, pinion 117 and gear 118. The lower and upper conveyors 42 and 83 are driven from shafts 116 and 119 respectively through the co-operating sprocket and chain connections heretofore described and knives 92 are set into rotation through sprockets 127 and 129 and the chain 128 associated therewith.

With the machine set into operation as described and attendant or attendants, who may be unskilled, are stationed at the forward end of the machine for placing slabs of meat such as indicated in Figures 6 and 7 on the lower conveyor 42 between guides 146. The slabs of meat will be placed on conveyor 42 in successive order on either side thereof or in two longitudinal series with the bellies positioned inward or toward the center of conveyor 42 and the fat backs positioned outwardly such as indicated in Figure 2. In order to place the slabs of meat in accurate position on conveyor 42 they are so placed that the shadow lines projected from knife edges 148 by light 149 will fall on the slabs of meat in the position it is desired to have the knife cut made for separating the fat backs from the bellies, the line shadows falling on conveyor 42 in the plane of knives 92.

As the slabs of meat are fed on the conveyor 42 in the manner set forth they will be carried forwardly by the conveyor and as the slabs of meat come between conveyors 42 and 83 they will be subjected to substantial, even pressure for making them of substantial uniform thickness; and due to the variation in thickness of different pieces of meat as well as to the different thickness of any one piece of meat, the upper conveyor 83 which is composed of the flexible apron composed of flights 84 and chains 85 will readily flex and the sprockets 81 as well as the rollers 87 are free to move upwardly under the yieldable resistance of springs 69 but the strength of springs 69 is such that the pieces of meat will be subjected to substantial pressure before rollers 87 will move upwardly from conveyor 42. While rollers 87 engage the inner surfaces of the upper flights 84 of conveyor 83 and the lower-most points of their circumferences are substantially at the same distance from conveyor 42 as sprockets 81 as indicated in Figure 3, thus providing a space of substantially uniform thickness between conveyors 42 and 83 in normal position of shafts 76 to which sprockets 81 and rollers 87 are secured. As the slabs of meat successively come in contact with knives 92 they will have been substantially flattened to their final or desired shape and the fat backs indicated at F in Figures 6 to 9 will be severed from the bellies B as indicated.

Due to the reduction in speed of the motor, the knives 92 rotate at a comparatively slow speed, usually of the order of 50 R. P. M., whereby no melting of the fat occurs and a smooth cut results. It will also be noted that the meat is cut while it is positively held between the two conveyors in a flat condition. There can thus be no slippage of the meat slab as a whole, nor can there be any piling up of the material thereof adjacent the rotary knives. It will be noted that due to the fixed position of shaft 79 conveyors 42 and 83 will be in fixed space relation adjacent the discharge end of the machine from which the successive pieces of meat emerge as the pieces of meat at this point are already flattened to a substantially fixed thickness. As the successive pieces of meat emerge from the machine the bellies and fat backs are collected by attendants or may be conveyed by suitable conveyors to desirable storage bins. Should it be found that the pieces of meat are not subjected to sufficient pressure, springs 69 are put under greater compression through manual operation of hand wheels 75 and should it be found that the space between conveyors 42 and 83 in the normal position of shaft 76 is not sufficiently wide, shaft 76 may be readily raised through manual operation of the hand wheel 66 and by manual operation of hand wheel 101 knives 92 through vertical adjustment of supports 88 may be raised or lowered for most effective co-operation with flights 43 of conveyor 42. Also the conveyor 42 may readily be adjusted as to tension by screws 31.

While the flights 43 and 84 of conveyors 42 and 83 respectively are normally in closely spaced relation the conveyors are subjected to substantial flexing movements resulting in substantial spaces between the flights into which spaces the meat may be forced by pressure if the pieces of meat move uniformly with the conveyors 42 and 83. In order to overcome the tendency of the meat to be forced between the flights, and to provide a smooth surface on the meat, the upper conveyor 83 travels at a slightly slower speed than lower conveyor 42 which results in a dragging or ironing effect on the pieces of meat thus obviating any tendency of the meat to be forced into the spaces between the flights, thus resulting in the flattened pieces having smooth faces.

As before stated, the pieces of meat are positioned on conveyor 42 by means of the guide shadow lines which are in longitudinal alinement with knives 92 in order that the knives will cut the pieces of meat on the lines indicated by the shadows. It is necessary that the pieces of meat travel through the machine between conveyors 42 and 83 without any turning movement thereof on the surfaces of the conveyor flights which is effected by the provision of the flexible lower and upper conveyors as above disclosed. If the upper conveyor flights were not capable of movement out of the plane of the upper flights of the lower conveyor as is the case with the use of upper pressure rollers in previous types of machines the pieces of meat which are substantially thickest at the center would have a somewhat pivotal action and would move out of the positions in which they were originally positioned resulting in an arcuate cut by knives 92 in severing the fat backs from the bellies. In Figure 6 is illustrated more or less diagrammatically a piece of meat comprising a belly B and a fat back F prior to the passage of the piece of meat through the machine. In this figure the straight line S indicates the correct line of separation between the belly and fat back and on which line the meat will be accurately cut by one of the knives 92 in accordance with the present invention due to the flexible upper and lower conveyors, while the curved or arcuate line C indicates an approximate cut which would be made if upper rollers were used instead of the flexible conveyor 83.

As the pieces of meat pass through the machine as thus described, the bellies B travel between conveyors 42 and 83 with the fat backs F projecting laterally outwardly of knives 92 as indicated in Figure 2, the belly being flattened and the fat back being severed therefrom without any flattening action as indicated in Figure 9.

In Figures 7, 8 and 9 is illustrated a piece of meat for indicating the action of the machine thereon and wherein it will be seen that the belly B which as clearly indicated in Figure 8 is irregular in thickness and which as well as fat back B is of curved formation while in Figure 9 in which the piece of meat is represented in its finished condition the belly B is flat and of substantally uniform thickness while the fat back F retains its original shape but is severed on the line S from the belly B.

The light 149 for casting the shadows of members 148 on the lower conveyor 42 may be mounted on the frame of the machine by a suitable bracket, or may be otherwise suspended, the only essential being that it be so spaced in relation to members 148 that the shadows thereof be aligned with rotary knives 92.

Although this invention has been described as designed for rolling hog bellies and cutting the fat backs therefrom it will be obvious that the invention is not so limited, since the machine may be put to many other uses, including the rolling and/or slicing of various kinds and shapes of meat slabs.

While I have described but one embodiment of my invention it will be apparent that various changes, additions, modifications, and omissions may be made without departing from the spirit and scope of the invention as set forth in the appended claims.

What I claim as new and desire to secure by United States Letters Patent is:—

1. A combined rolling and cutting machine for meat slabs comprising two endless conveyors for receiving the meat therebetween and rolling the same, a knife for slicing part of the meat from the slab, and means for driving said endless conveyors at slightly different speeds to cause an ironing of the meat slabs.

2. A combined belly rolling and fat back cutting machine comprising an endless conveyor for receiving slabs of meat thereon, a second endless conveyor above said first named conveyor, longitudinally spaced means for guiding and driving said second conveyor, a roller between said longitudinally spaced means for pressing said upper conveyor toward said lower conveyor, and a rotary knife secured at one side of said upper conveyor and adjacent said roller.

3. A combined belly roller and fat back cutting machine comprising an endless conveyor for receiving slabs of meat thereon, a second endless conveyor above and cooperating with said first conveyor to press said slabs of meat under pressure distributed over both sides of said slabs, said upper conveyor being of substantially less width than the lower conveyor, and a rotary knife at one side of said upper conveyor whereby the slabs of meat are cut while being maintained under pressure between said conveyors.

4. A combined belly rolling and fat back cutting machine comprising two endless conveyors for receiving slabs of meat therebetween and pressing the same, rotary knives for slicing the fat backs from the bellies of said slabs of meat, and common driving means for said two conveyors and said rotary knives, said driving means causing one of said conveyors to move faster than the other.

5. In a combined belly rolling and fat back cutting machine, a support for receiving slabs of meat thereon, an endless conveyor above said support including spaced pivotally supported sprockets for receiving and guiding said conveyor, and manually adjustable means for varying the position of one of the pivotally supported sprockets with relation to said support to thereby vary the pressure on said slabs of meat.

6. The invention as defined in claim 5 wherein a roller presses upon said conveyor between said sprockets, and means for manually adjusting the pressure of said roller.

7. In a machine for rolling slabs of meat, a support for receiving slabs of meat thereon, an endless conveyor above said support and cooperating therewith to press said slabs of meat, a sprocket upon which said conveyor is supported, a pivotal support for said sprocket, manually operable means for adjustably raising said pivotal support for said sprocket, and yieldable means maintaining said pivotal support in engagement with said adjustable means, a roller pressing upon said conveyor to press said slabs of meat at a point between said sprockets, a pivotal support for said roller, and adjustable and yieldable means for said pivotal support.

8. A belly rolling and fat back cutting machine comprising two endless conveyors yieldingly pressed toward one another for receiving slabs of meat therebetween, rotary cutting knives for severing the fat back while the slabs of meat are held between said conveyors, and guiding fingers projecting outwardly at the receiving end of said machine in longitudinal alignment with said knives.

In testimony whereof I affix my signature.

R. G. REYNOLDSON.